Dec. 10, 1968 L. STEINER 3,415,153
MECHANICAL CLAMPING DEVICE
Filed April 2, 1965 4 Sheets-Sheet 1

INVENTOR.
Lajos Steiner
BY
ATTORNEY

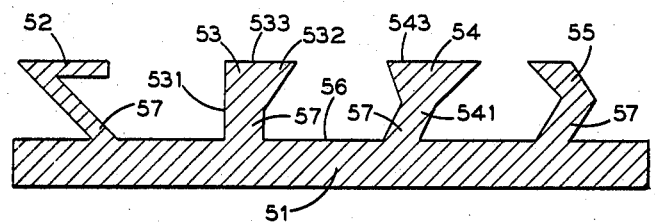
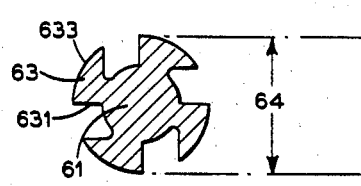
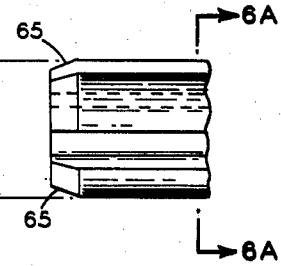
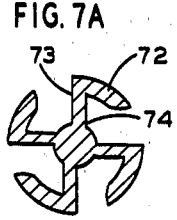
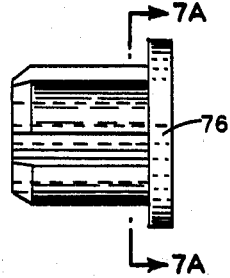

Dec. 10, 1968 L. STEINER 3,415,153
MECHANICAL CLAMPING DEVICE
Filed April 2, 1965 4 Sheets-Sheet 4
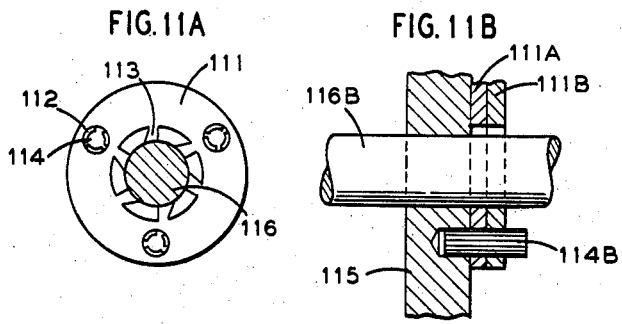
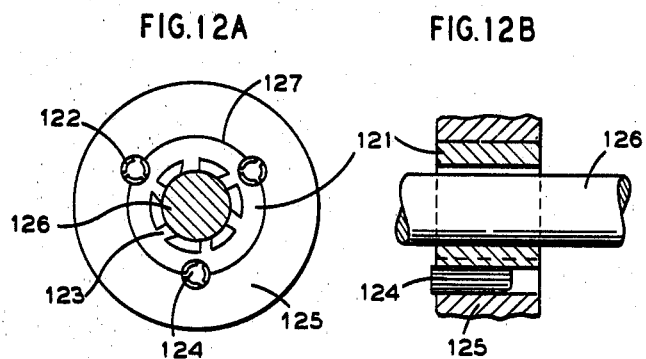

United States Patent Office 3,415,153
Patented Dec. 10, 1968

3,415,153
MECHANICAL CLAMPING DEVICE
Lajos Steiner, 2 Beresford House, 1 Harriette St.,
Neutral Bay, New South Wales, Australia
Filed Apr. 2, 1965, Ser. No. 445,183
1 Claim. (Cl. 85—5)

ABSTRACT OF THE DISCLOSURE

There are disclosed frictional clamping devices for constraining non-perpendicular relative motions between two surfaces. One class of devices comprising an elastic ridge member fixed to one of the surfaces and having a bearing surface engaging the other surface. Another class of the devices includes friction bolts with a central core having at least two longitudinal clamping ridges each including a base portion attached to the core and bearing surfaces at the other ends of the ridges.

---

In my copending application, Ser. No. 406,069, filed Oct. 23, 1964, I have described a mechanical clamping means which consists of an elastically deformable insert designed to prevent certain types of relative motion of objects between the surfaces of which the insert is placed. The present invention relates to certain variations in and improvements based on the same general principles as those embodied in the previous invention, which employs the principle of clamping by insertion.

Frictional clamping by insertion may be employed in a large variety of applications, all of which have certain features in common. Specifically, this type of clamping is applicable to a configuration in which adjacent elements of the surfaces to be clamped are substantially parallel, (although the surfaces as a whole need not be plane) and are so constrained that their separation is limited to an amount which will be referred to hereafter as the "spacing." Typical examples of such surfaces are two parallel planes or two coaxial cylinders. Relative motion of the surfaces in directions other than perpendicular to the surface elements is not necessarily constrained, and the constraint of such non-perpendicular motion is the function of the clamping device.

A typical example of the clamping of coaxial cylinders is the clamping of a gear, pulley, cam, or the like to a shaft. Many methods for such clamping are well known. A familiar method is the use of one or more setscrews, the usual arrangement being the use of two setscrews 90 degrees apart. Aside from the fact that setscrews are subject to loosening by vibration, they have the additional disadvantage that their points, whether cone or cup, tend to burr the shaft; this is not too serious in the case of a pulley, but in the case of a cam, the burrs interfere with the subsequent adjustment of angular position, particularly where the new setting is quite close to, but not identical to, a previous one.

Another type of fastener sometimes used for the purposes just described consists of a pair of tapered bushings driven between the shaft and the hub of the pulley or gear. While these have the advantage of distributing the forces on shaft and hub over a larger area and thus of avoiding burring, and while they do not necessarily require any special machining of the hub or shaft, the tapered construction is particularly susceptible to loosening by vibration, since once an axial displacement of the tapered members starts, the frictional forces on shaft and hub decrease rapidly as the displacement increases.

Where fine adjustment of angular position is not required, but where loosening of setscrews by vibration is a problem, it is common practice to provide a flat (or two flats 90 degrees apart) on the shaft, permitting the setscrews (usually cup point) to bear against a plane rather than a cylindrical surface. This requires, however, an extra machining operation. The same is true in the case of keying or pinning, where keyways or holes must be provided in both hub and shaft.

In my copending application referred to above, I described a clamping means which was separate from the objects to be clamped and was inserted between them, as between a hub and a shaft. The present invention deals with clamping means of the same class, but which are a part of, or securely fastened to, one of the objects to be clamped.

Accordingly, the principal object of this invention is to provide an improved clamping device.

A more specific object of this invention is to provide a simple and inexpensive device for clamping plane surfaces whose spacing is limited to a specified amount.

A further object is to provide a claimping device designed for simple assembly of the objects to be clamped.

It is also an object of this invention to provide a clamping device which minimizes damage to the surfaces clamped.

A still further object is to provide a clamping device which can be both manufactured and installed at low cost, and is thus applicable to large volume, mass-produced assemblies.

An important object of this invention is to provide a simple clamping device for securing gears, pulleys, and the like to a shaft.

Another object is to provide a device for clamping gears, pulleys, and the like to a shaft without the need for flats, keyways, setscrews, or pins.

Still another object is to provide a more satisfactory device for clamping gears, pulleys, and the like to a shaft than the tapered bushings sometimes used, the latter being subject to loosening by vibration.

A further object is to provide a simple device for producing slip-free joints in structures.

One of the important objects of this invention is to provide an improved substitute for bolts, rivets, self-tapping screws, and the like which can be more easily and quickly installed than the devices mentioned.

Briefly, according to the invention, the first of the two surfaces to be clamped is provided with raised ribs or ridges, shaped in such a fashion that when the two surfaces are in the position in which they are to be clamped, the ridges are so stressed as to engage the second surface frictionally and resist relative motion of the two surfaces.

Other objects, features, and advantages of the invention will be apparent from the following descriptions when read with the accompanying drawings, in which:

FIGURE 5 shows four alternative shapes of clamping ridges formed as integral parts of an object to be clamped;

FIGURES 6A, 6B and 7A, 7B show two variations of the clamping ridges illustrated in FIGURE 5, as formed on the circumference of an insert or "bolt" of circular cross-section;

Figure 9A:
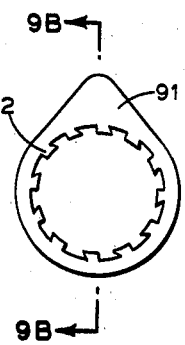
FIGURES 9A and 9B show the clamping ridges disposed around the shaft hole of a cam.
Figure 9B:
Figure 10A:
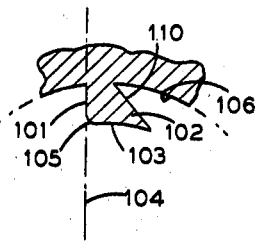

FIGURES 10A' and 10B show enlarged details of two alternative forms of clamping ridges applicable to the device of FIGURE 9;

FIGURES 11A and 11B show the use of separate annular members having clamping ridges, to secure a device having a smooth-bore hole to a shaft; and FIGURES 12A and 12B show an alternative form of the annular member of FIGURE 11.

Figure 1:
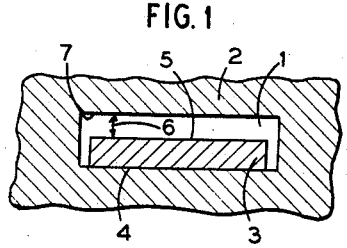
FIGURE 1 is a cross-sectional view of a typical configuration of elements requiring the clamping of plane surfaces.

Referring now to FIGURE 1 a situation will be seen which illustrates in one of its simplest forms an application for clamping by insertion. A rectangular slot 1 in a casting 2, of which only the part immediately surrounding the slot 1 is shown, is to receive a bar 3, the latter being inserted in a direction perpendicular to the plane of the drawing. When the bar 3 rests against the lower surface 4 of the slot 1, its upper surface 5 is separated by the spacing 6 from the upper surface 7 of the slot 1, but is constrained by the lower surface 4 of the slot 1 from motion in such a direction as to increase the spacing 6. Thus a suitable clamping device, secured to either of the surfaces 5 or 7, can be made by frictional engagement of the other surface to resist the withdrawal of the bar 3.

Figure 2:
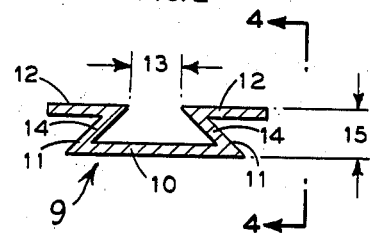
FIGURE 2 is a cross-sectional view of a clamping device intended to be attached to one of the surfaces of FIGURE 1 in accordance with an embodiment of the invention, to produce the desired clamping effect.

FIGURE 2 shows an embodiment of the invention, clamping device 9, which when attached to one of the surfaces 5 or 7 of FIGURE 1 is suitable for clamping the configuration shown in that figure. Clamping device 9 consists of a member 10 to be attached to one of the surfaces 5 or 7, two separating bars 14 attached at their bases 11 to member 10, and two clamping bars 12 which, upon assembly of the members 2 and 3, engage frictionally the other of the two surfaces. The combination of a separating bar 14 and its clamping bar 12 comprises what is hereafter called a "clamping ridge."

The clamping device 9 will normally be formed by drawing or extrusion of some plastically deformable material, preferably metal, or synthetic plastic such as polyethylene, polypropylene, or vinyl copolymers. Thus, although it is convenient in describing the invention to speak of the clamping bars 12, the separating bars 14, and the supporting member 10 as if all were separate elements, it will be apparent from FIGURE 2 that actually they all form parts of one continuous array, and it is not necessary that the array have sharply-defined boundaries between the edges of the separating bars 14 and those of the bars 12 and the supporting member 10 respectively.

Figure 3:
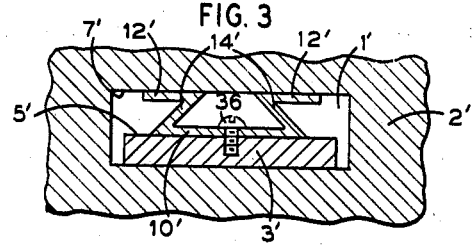
FIGURE 3 shows the clamping device of FIGURE 2 installed in the assembly of FIGURE 1.

In using the clamping device 9 to clamp the bar 3 into the slot 1, the device 9 is so constructed that its dimension 15 is slightly greater than spacing 6 (FIGURE 1). Device 9 is then used as shown in FIGURE 3, in which parts corresponding to those of FIGURES 1 and 2 are shown with the same identifying numbers with prime designations added. Supporting member 10' is here shown secured by means of a screw 36 to surface 5' of bar 3'. When bar 3' is inserted into slot 1', separating bars 14' will be stressed, since device 9 was dimensioned to have a thickness greater than the space into which it was to be forced. The result is that clamping bars 12' will exert a perpendicular force on surface 7', resulting in frictional forces which will resist the insertion, but likewise the subsequent withdrawal, of bar 3'. The magnitude of these frictional forces will depend on the coefficient of friction and on the magnitude of the perpendicular force, and the latter will depend on the strain energy stored in bars 14'. Such strain energy depends in turn on a variety of factors—the geometry of the array of device 9, the modulus of elasticity of the material, and the amount of compression (i.e., the ratio of the thickness 15 of the clamping device to the spacing 6). It should be noted that compression also results in the bars 12' moving closer together in the particular configuration shown; thus the distance 13 (FIGURE 2) is decreased in the clamping position.

It is possible for the elastic limit to be exceeded in certain parts of the device 9 provided the characteristics of the material are such as to permit flow rather than fracture. In such a case the bar 3' could probably not be removed from one assembly and reused in a different assembly in which the spacing 6 is greater, but assuming that the bars 14' or parts thereof are still elastically deformed, the combination of device 9 and bar 3' will hold in its original position even after being withdrawn and reinserted. Thus if some plastic deformation is permitted, the relation between the spacing 6 (FIGURE 1) and the clamping device thickness 15 (FIGURE 2) need not be maintained to close tolerance.

Figure 4:
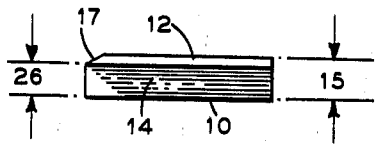
FIGURE 4 is a side view taken along the lines 4—4 of FIGURE 2 showing the manner in which the clamping device may be chamfered for easier insertion.

Since the clamping device 9, together with the bar 3', must form an interference fit in slot 1', it is desirable that one end on device 9 should be chamfered to facilitate assembly. FIGURE 4 shows the use of such a chamfer 17, in order to reduce the sum of the thickness of bar 3 and the end thickness 26 of device 9 to an amount less than the width of slot 1.

Thus far the clamping means of this invention has been described in terms of a separate device secured to one of the surfaces to be clamped. In many cases, however, it will prove more desirable to produce the desired clamping action by modifying one of the members to be clamped, providing ridges or projections on one of its surfaces which provide the same effect as the separating bars 14 and the clamping bars 12 of the device 9. Then the clamping device becomes an integral part of one of the members of an assembly. FIGURE 5 shows in cross-section four typical examples of many possible types of clamping ridges which can be formed as integral parts of a member such as bar 51, the part 57 of the ridge which joins it to bar 51 being called the base. Ridge 52 is of the same shape as the combination of separating bar 14 and clamping bar 12 of FIGURE 2. Ridge 53 is designed to accept higher stresses than ridge 52; it has one side 531 approximately perpendicular to surface 56, and a projecting lip 532 on the other side which serves the dual purpose of providing an increased bearing surface 533 and causing increased bending stresses in ridge 53; if both sides of ridge 53 were perpendicular, practically all of the stresses would be compressive, and with many materials this would increase the forces needed for assembly and tend to produce plastic rather than elastic deformation. Thus in all cases the ridges are given an asymmetric cross-section to give an increased and controlled amount of bending stress to the ridges.

Ridge 54 is designed for stresses intermediate between those appropriate to ridges 52 and 53 respectively. It has a base section 541 which forms an angle other than a right angle with surface 56, so that compressive stresses are reduced in favor of bending stresses, and has, as in ridge 53, a wide bearing surface 543. Ridge 55 is designed for applications where relatively low stresses are desired. Compressive stresses are very low, practically all stresses being bending stresses. This form is desirable where numerous insertions and withdrawals are contemplated; in such cases plastic deformation should be reduced to a minimum. Ridge 55 is also well suited to situations where the dimensional tolerances cannot be held close, since it can accept a rather wide range of compressions without exceeding the elastic limit.

All of the ridge contours shown in FIGURE 5 have one thing in common—they are so designed that after assembly a significant part of the total stress on the ridge is a bending stress, while compressive stress may be proportionately of greater or lesser degree depending on the precise contour of the ridge. By making the bending stress a significant component of the total stress, it becomes possible to increase the ratio of elastic to plastic deformation, thus maintaining a more uniform clamping force under varying load conditions.

While the invention has been described thus far in terms of ridges secured to or formed as projections on plane surfaces, there are other important embodiments of the invention having many useful applications. Two significant cases are those in which the ridges are formed on convex or concave cylindrical surfaces, particularly those cases in which such surfaces are those of circular cylinders.

FIGURES 6A and 6B show, in cross-section and elevation respectively, what can be termed a "friction bolt" consisting of a core 61 of circular cross-section bearing four longitudinal ridges 63 of a form similar to 53 of FIGURE 5, but with cylindrical bearing surfaces 633. In the example illustrated, one side 631 of each ridge lies in a plane passing through the axis of the bolt, and corresponds to side 531 in FIGURE 5. Such a ridge geometry is intended to facilitate control of the ratio of bending to compressive stress. In use, the friction bolt is forced into a hole of slightly smaller diameter than the outside diameter 64 of the bolt, thus stressing the ridges; this produces frictional forces which resist withdrawal of the bolt. Insertion can be facilitated by provision of a short taper 65 at one end of the bolt. Several variations of the basic design are possible. For example, where the bolt will be subjected primarily to shear stress, it can be headless; the elimination of a projecting head without the necessity for a countersunk or counterbored hole can be advantageous in preventing weakening around the bolt-hole in the members being secured. Headless bolts can be used in securing structural steel members, replacing rivets, conventional bolts, or welds. Likewise, a headless bolt can substitute for a taper pin in securing a gear or the like to a shaft; here the elimination of the need for a tapered hole represents a saving.

Where the bolt is subject to larger axial forces, it can be provided with a head in the manner of a conventional bolt, the hole in the member through which the bolt is first inserted being in this case a clearance hole if desired. Since the bolt is not tightened by turning, the use of a flat washer under the head is unnecessary, although a lock washer can still be used if required. Insertion becomes simpler with a straight driven friction bolt, particularly in confined spaces where it is difficult to use a wrench, and since the axial as well as the shear strength of the bolted joint are determined by the characteristics of the bolt, the size of the hole, and the material into which the bolt is driven, rather than being influenced by the degree of tightening as with a conventional bolt, the use of a torque wrench to produce joints of predictable characteristics becomes unnecessary.

Because of its ease of insertion, the friction bolt is well-adapted to low-cost, mass-production assembly processes, particularly to processes using automated techniques. Its own production cost is low, as the basic wire can be formed easily by extrusion or drawing, while the taper, and head where required, can be produced by conventional cold-heading techniques.

Figure 8:
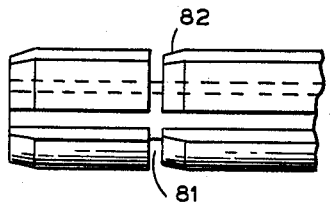
FIGURE 8 shows the manner in which an annular groove can be used to improve the holding power of the device of FIGURE 6 when the latter is required to resist withdrawal from either of two adjacent objects.

FIGURES 7A and 7B show, in cross-section and elevation respectively, a friction bolt having ridges of a shape more similar to 52. Since the ridges, each consisting of a base section 74 and a projecting lip 72, are more easily deformed elastically than the ridges 63 of the bolt of FIGURE 6, the bolt of FIGURE 7 is more adaptable to the fastening of attachments to structures consisting of materials such as rigid plastics or die-castings of zinc alloys and the like, where insertion of a bolt of the type shown in FIGURE 6A would tend to cause the ridges to cut into the material instead of being stressed by it. For such application a headed bolt is more likely to be required, so the head 76 has been shown on the elevation FIGURE 7B. As in the bolt of FIGURE 6A, one side 73 of the ridge lies in a plane passing through the axis of the core.

Where a friction bolt, particularly of the headless type, is used to join two members, and it is important that the bolt resist axial forces in both members in spite of possible slight variations in hole diameters in the respective members, a form such as that shown in FIGURE 8 can be used. Here an annular groove 81 is used to prevent the axial transmission of stresses along the ridges from one section of the bolt to another. An additional taper 82 facilitates the entry of the second section of the bolt into the bolt hole. Where a headed bolt is used, a similar annular groove adjacent to the head can be advantageous.

Figure 10B:
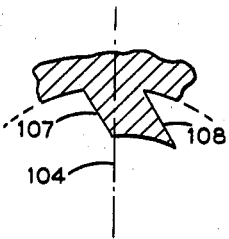

FIGURES 9A and 9B show in transverse and longitudinal cross-section respectively the manner in which clamping ridges 92 can be disposed around the inner surface of a shaft hole in a rotating member 91 (in this case a cam) for the purpose of securing it to its shaft without the need for keys, setscrews, or the like. Here again the ridges can have any of several shapes, the one shown in FIGURE 10A being preferred for heavy loads. One side of this type of ridge, the side 101, lies along a diameter 104, being thus analogous to side 51 of ridge 53, and the bearing surface 103 conforms to the shaft contour. The under side 110 of the projecting lip 102 is carried down in a straight line to the inner surface 106 of the main body of the cam. A slight radius 105 can be provided at the otherwise sharp intersection of 101 and 103 if possible scoring of the shaft is to be minimized. This same treatment is possible with the ridges of FIGURES 5, 6, and 7.

Where loads are light, and simplicity and economy of assembly is important, as in mechanical toys, a ridge design similar to that of FIGURE 10B may be preferable. Here neither side, 107 nor 108, of the ridge lies along a diameter; this more flexible ridge design makes the device easier to press onto the shaft, but cannot in general transmit as much torque as the type shown in FIGURE 10A, particularly in the direction of rotation which tends to bend the ridge away from the radius of the shaft. In fact, in certain applications a ridge design similar to that of FIGURE 10B can be used to give the effect of an overrunning clutch, preferably in an application where operation in the slipping direction occurs only infrequently and thus does not contribute materially to shaft and ridge wear.

Cams, gears, sprockets, and the like embodying the internal ridges described above and illustrated in FIGURES 9A, 10A and 10B, can be produced by stamping in the case of light-duty components, especially where thickness of the sheet stock is small; by extrusion in tubular form followed by a cutoff operation; or by forming the internal ridges by means of a broaching operation on blanks having smooth-bore or semi-finished openings. Subsequent heat-treating can be applied when required. The invention makes possible the economical production of such assemblies as camshafts for internal-combustion engines, providing significant savings as compared to the cost of machined camshafts.

FIGURES 11A and 11B show an embodiment of the invention in which one or more annular members each having ridges disposed around a central opening are used to secure to a shaft a cam or the like whose shaft opening has a smooth bore. Such an assembly has the advantage that a single type of annular member can be mass produced economically, and used singly or in multiples, according to torque requirements, with a wide variety of cams, gears, and the like which themselves need not each be individually designed with clampnig ridges. FIGURE 11A shows the annular member 111 as viewed parallel to the shaft axis. Each of the ridges, such as 113, bears against the shaft 116. Holes of circular cross-section, of which 112 is an example, and of which three are shown in FIGURE 11A, are provided for securing the annular member to the cam or other device. In the example shown, friction bolts 114 similar to those of FIGURE 6 but with three instead of four ridges each, are shown being used for this purpose.

FIGURE 11B shows in cross-section two annular members 111A and 111B used to secure a cam or similar device 115, shown in part, to a shaft 116B. The assembly 111A, 111B, and 115 is held together by means of friction bolts of which one, 114B, is shown.

Instead of securing the annular member bearing the clamping ridges to the face of the cam, gear, or the like, the latter can be provided with an oversize bore and the annular member used as a type of bushing between the device and the shaft, as shown in FIGURES 12A and 12B. FIGURE 12A shows the assembly as viewed axially along the shaft; the annular member 121 with its ridges, such as 123, bearing on the shaft 126, is inserted in the manner of a bushing into the cam or other device, a portion of which is shown as 125, and holes 122, of which three are shown in this example, are provided to span the interface 127 of annular member 121 and device 125. Friction bolts such as 124 are inserted in holes 122 to secure device 125 to member 121.

While only a few of the embodiments of the invention have been described and illustrated herein, it will be apparent to one skilled in the art that there are numerous other variations which embody its basic principles. Accordingly, the invention is not intended to be limited to the particular embodiments set forth herein.

What is claimed is:
1. A friction bolt comprising a solid central core of substantially circular cross section, and at least two elastically deformable longitudinal clamping ridges, each having a base joining it to the central core, with one side surface located in a radial plane passing through the axis of said core and a second side parallel with the first side, said ridge terminating in a bearing surface defined by an arcuate portion of a hollow right cylinder coaxial with and of greater radius than said core, said bearing surface starting at said one side surface and overhanging said second side surface, said bearing surface having a dimension, as measured circumferentially around said cylinder, greater than the dimension of the base as measured circumferentially around said core.

References Cited
UNITED STATES PATENTS

| 2,056,309 | 10/1936 | Osenberg | 85—19 |
| 2,125,018 | 7/1938 | Hamill. | |
| 2,551,834 | 5/1951 | Ferguson. | |
| 2,820,209 | 1/1958 | Whitted | 85—19 X |
| 2,995,328 | 8/1961 | Whitted | 248—71 |
| 3,177,540 | 4/1965 | Hall et al. | |

CARL W. TOMLIN, *Primary Examiner.*

A. KUNDRAT, *Assistant Examiner.*

U.S. Cl. X.R.

87—127